United States Patent
Budde et al.

(10) Patent No.: US 9,374,268 B2
(45) Date of Patent: Jun. 21, 2016

(54) METHOD AND ARRANGEMENT FOR ASSIGNING NAMES TO DEVICES IN A NETWORK

(75) Inventors: Wolfgang Otto Budde, Aachen (DE); Tobias Helbig, Godstone (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2225 days.

(21) Appl. No.: 10/542,059

(22) PCT Filed: Jan. 6, 2004

(86) PCT No.: PCT/IB2003/006291
§ 371 (c)(1),
(2), (4) Date: Dec. 2, 2005

(87) PCT Pub. No.: WO2004/064329
PCT Pub. Date: Jul. 29, 2004

(65) Prior Publication Data
US 2006/0168342 A1    Jul. 27, 2006

(30) Foreign Application Priority Data
Jan. 15, 2003  (EP) .................................. 03100060

(51) Int. Cl.
*G06F 15/16*    (2006.01)
*H04L 29/12*    (2006.01)
(Continued)

(52) U.S. Cl.
CPC .......... *H04L 29/12594* (2013.01); *H04B 1/202* (2013.01); *H04L 12/2803* (2013.01); *H04L 12/2807* (2013.01); *H04L 29/12009* (2013.01); *H04L 29/12207* (2013.01); *H04L 61/20* (2013.01); *H04L 61/3065* (2013.01); *H04L 12/282* (2013.01); *H04L 2012/285* (2013.01); *H04L 2012/2841* (2013.01); *H04L 2012/2849* (2013.01)

(58) Field of Classification Search
CPC ................... H04M 17/305; H04M 2017/2531; H04M 2250/02; H04M 2250/04; H04B 10/114
USPC ....................................................... 709/245
See application file for complete search history.

(56) References Cited

U.S. PATENT DOCUMENTS 4,529,980 A    7/1985   Liotine et al.
4,912,463 A    3/1990   Li
(Continued)

FOREIGN PATENT DOCUMENTS

JP    1023548    1/1998
JP    200048968 A    2/2000
(Continued)

OTHER PUBLICATIONS

Reusch, D., "Irda Soll Schneller Werden," Funkschau, Franzis-Verlag K.G. Munchen, DE; vol. 72, No. 18 Aug. 20, 1999 pp. 24-26 (3 pages).

*Primary Examiner* — Esther B Henderson
(74) *Attorney, Agent, or Firm* — Meenakshy Chakravorty

(57) ABSTRACT

A device arrangement for a network includes a plurality of devices that can be actuated electronically by a user. Each device has a name memory in which is stored a device name uniquely assigned to the device, to enable the particular device to be uniquely actuated within the network. The device name stored in the name memory can be individually selected and/or changed by the user by a mobile input unit that has a short-range electronic data link to the device to be selected.

11 Claims, 1 Drawing Sheet

(51) Int. Cl.
  *H04B 1/20*     (2006.01)
  *H04L 12/28*    (2006.01)

(56)          References Cited

U.S. PATENT DOCUMENTS 5,299,113  A        3/1994   England et al.
  5,467,263  A       11/1995   Gilbert
  5,815,086  A  *     9/1998   Ivie et al. .................. 340/825.52
  5,847,305  A  *    12/1998   Yoshikawa et al. ............. 84/634
  6,791,467  B1 *     9/2004   Ben-Ze'ev ............... 340/825.69

2001/0049761 A1    12/2001   Huang
  2002/0029258 A1 *   3/2002   Mousseau et al. ............ 709/218
  2002/0174270 A1 *  11/2002   Stecyk et al. ..................... 710/1
  2004/0054747 A1 *   3/2004   Breh et al. .................... 709/208

FOREIGN PATENT DOCUMENTS

JP         2001103584  A         4/2001
  JP          200216539  A         1/2002
  JP         2002330483  A        11/2002
  KR         2002011029  A    *    2/2002
  WO            0043870             7/2000

* cited by examiner

METHOD AND ARRANGEMENT FOR ASSIGNING NAMES TO DEVICES IN A NETWORK

The invention relates to a device arrangement for a network, and in particular a home network comprising a plurality of devices, particularly consumer electronics devices, building control devices, home entertainment electronics devices and/or network control devices, each device having a name memory in which is stored a device name uniquely assigned to the device, to enable the particular device to be uniquely actuated within the network by the user.

In known networks, the unique names or addresses of the individual devices on the network are laid down at machine level by network protocols, such for example as DHCP (Domain Host Control Protocol) or DNS (Domain Naming Service). Automatic address allocation is known for the Internet Protocol (IP). Network addresses mainly comprise numbers and these, although they do uniquely identify the device, are not very meaningful to a human user.

If for example there are on a network two television sets having names preset by the manufacturer such as "TV_12345" and "TV_54321", the user to whom these names are shown on the display of a network control device, such as a personal computer for example, is not given any further information to tell him which of the two television sets that can be operated on the network bears which name. This is inconvenient, because the user has to make a note of how the names are assigned in this case.

However, changing a name, in order for example to give a name that is meaningful, is too complicated for a normal human user with the known protocols (e.g. DNS). This is particularly true in the field of home networks, where even someone who is only an occasional user ought to be in a position to operate the devices.

It is an object of the present invention to provide a device arrangement for a network, as detailed in the opening paragraph, whose convenience of operation for the user is improved.

The idea that is central to the invention is to simplify the giving of names for the user, by enabling names to be entered on a mobile input unit and transmitted by the latter to a device. It is possible for the user to select the particular device by bringing the input unit close thereto.

For this purpose, the invention provides a mobile input unit with which the name of a device that is stored in the name memory can be selected and/or changed. The mobile input unit has an input means, such for example as a keypad or a touch-screen, for entering a desired device name, and an electronic data link for communication with a device. The input unit may also have display means, such as a screen for example.

Some of the terms used will first be explained. The invention relates to networks, and particularly to home networks. The devices on the network are connected to an electronic data link. There are various types of links of this kind can that can be used in this case, among which are hard-wired links using for example network cables or wireless links made for example by radio. There are known protocols for the particular hard-wired or wireless links such as Ethernet, Wireless LAN (IEEE 802.11), ZigBee (IEEE 802.15.4) and Bluetooth amongst others. A home network connects together a plurality of devices that are provided in a house, an apartment or a building. The devices may be domestic control devices such for example as lights, switches or the like, and more sophisticated devices such as electronically controlled heating systems or louvers. Infotainment devices comprise devices for recording, storing, playing and transmitting material carried on or originating from the media, and are for example displays of any kind including TV displays, storage devices such as VCR's, loudspeakers, cameras, video recorders, camcorders and the like. A third category of devices is editing and (network) control devices such for example as personal computers, so-called smart remote controls, etc. So, although a home network may comprise data-processing devices, such as a personal computer for example, data-processing devices of this type are not the only kind of devices that may be present, other than on pure data or computer networks. As a rule, a home network comprises at least one device, and preferably a plurality of devices, that fall into the consumer electronics and/or home entertainment electronics categories. What are typical of home networks are application-dedicated devices that are programmable to only a limited degree.

A given device has to be uniquely identifiable within the network so that, if it is actuated in the appropriate way by the user, by means of a control device for example, it will perform the appropriate function. The invention now makes it possible for the user himself to define the names of individual devices on the network in a simple way. In the example cited above to illustrate the prior art, he can define the names of the two television sets as, say, "Living-room TV" and "Bedroom TV". In this way, the identity of a given device is uniquely apparent to the user simply from its name. The names of the devices are preferably items of alphanumeric data to enable the user to give names that are meaningful and easy for him to assign.

The name memory is usefully a read/write memory, i.e. is suitable for repeated reading and writing. It is also usefully arranged to store alphabetic or alphanumeric characters to make it possible for names that can be remembered to be formulated. Preferably, each individual character of a name is freely selectable by the user, i.e. not simply fixed strings of characters such for example as "TV" or "VIDEO", to allow the user the greatest possible freedom in choosing the names employed. When required, when there is a change of user for example, names that have once been defined for devices may be changed again in the same way.

In accordance with the invention, the device names are entered by the user by means of a mobile input means. In an especially preferred embodiment, a mobile input unit having for example an alphanumeric keyboard or a touch-sensitive display as the input means is provided. The input unit is preferably handy, i.e. is of the same size and weight as typical remote controls; this is not true of personal computers or notebooks but it may be true of palmtops, organizers and mobile telephones for example.

The user can easily bring the mobile input unit into the vicinity of a device whose name is to be changed. The device having been selected in this way by bringing the input unit close to it, its name is transmitted over an electronic data link between the input unit and the device.

In accordance with the invention, the range that the electronic data link has for this purpose is so short that, by positioning the input unit close to the given device, this device is selected from among the devices on the network. This is for example the case when the range is shorter than the usual spacing at which devices are generally set up on the network. This spacing may vary with different networks. On home networks for example it may be a few meters, and preferably less than 3 meters, and especially preferably less than 1 meter. A typical figure could for example be 10-20 cm. In a further embodiment, the range may be set to a suitable size by the user, within a range of for example 10 cm to 3 m.

The advantage of a short range of this kind is that it makes it simple for the user, by using the input means, to select a given device and select, read out or change its name. The device is selected simply by bringing the mobile input means close to it, e.g. by pointing it at the device to be selected. Selection of this kind is very simple, intelligible and convenient for the user.

As explained above, the devices on the network have transmission means for making the electronic data link among themselves. The electronic data link between the input unit and a device may be made by the same type of transmission means as is used to link the devices together, or by another, second type.

If the type of data link between the input unit and a device is selected to be the same as that linking the devices together, the preferred short range may be obtained by using means for reducing the range. This may include the analysis of transit times. What is preferable however is a reduction in power, and preferably in the power transmitted by the transmission means in the mobile input unit.

Alternatively, different types of data link may be selected, namely a first type for communication by the devices amongst themselves and a second type for communication with the input unit. In this case too the range of the data link of the second type is preferably limited. In a preferred embodiment, what is used for communication between a device and the input unit is a short-range wireless transmission means such for example as an infrared link or a radio link of suitably limited transmitted power.

In a further embodiment of the invention, provision is made for the transmission between the input unit and a device to be a wireless, directional transmission. What is meant by this is firstly any form of wireless transmission having a directional characteristic that is not fully symmetrical. What are especially preferred are directional transmissions having a narrow directional characteristic from the input unit. For infrared transmission this can be achieved by, for example, a suitable optical system, and for radio by for example the multi-antenna technique.

These and other aspects of the invention are apparent from and will be elucidated with reference to the embodiments described hereinafter.

Figure 1:
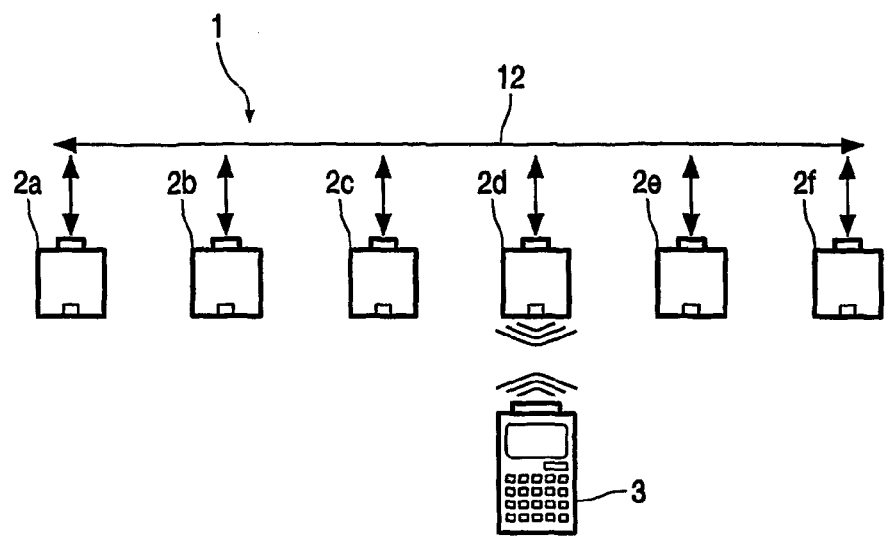
FIG. 1 is a diagrammatic representation of a device arrangement for a home network.
Figure 2:
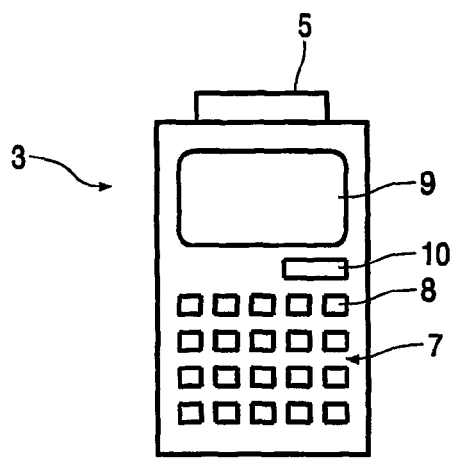
FIG. 2 is a diagrammatic representation of an input unit.

On the home network 1, there are a plurality of devices 2a, 2b, 2c ..., six in the present example, connected together via a network link 12. The devices 2a, 2b, 2c ... as a whole or, in context, any single one of these devices will be referred to below for short by the reference numeral 2. A network 1 may for example comprise a television set 2a, a personal computer 2b, another television set 2c, a video recorder and player 2d, a light switch 2e and another light switch 2f.

Figure 3:
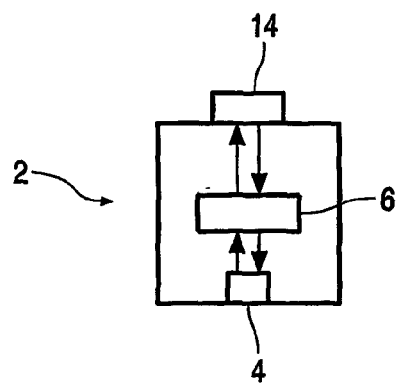
FIG. 3 is a diagrammatic representation of a device for a home network.

The network link 12 may be made by hard-wiring or wirelessly. The devices 2, of which a single one is shown in FIG. 3, have appropriate first transmission means 14. These may for example be ZigBee interfaces. ZigBee is a wireless transmission standard that is used in particular in the field of home networks. The lower protocol layers of this are standardized in IEEE 802.15.4. For infotainment devices on the other hand, due to the wider bandwidths required, a wireless LAN under IEEE 802.11 will be a better candidate.

All the devices 2 can be actuated electronically over the network link 12. In the case of a light switch, the relevant device 2e, 2f comprises not only the making/breaking unit proper but also a control means having an electronic circuit for actuating the making/breaking unit.

Provided within each device 2 is a name memory 6 which is a read/write memory. Stored therein is an alphabetic or alphanumeric device name that identifies the device and by means of which it is possible for the device 2 to be actuated individually within the network 1.

A device 2 is actuated for the purpose of giving it an individual name by means of an input unit 3. This latter is handy and mobile and may for example be a remote control. The input unit 3 has a transmission means that in the present example is formed by an infrared module 5. To allow a device name to be entered for a device 2, there is provided for example an alphanumeric keypad 7 having individual keys 8. Some other keypad may also be used, such for example as one having more than one letter assigned to each key as on many mobile telephones. The number of keys may then be smaller and may for example be twelve. A touch-sensitive display may also be used. The characters entered are shown on the display 9.

In the example shown, communication between the devices 2 and the input unit 3 is short-range wireless communication. For this purpose, each device has a transmission means 4 of the same type as the transmission means 5 of the input unit 3. The wireless transmission may be performed by means of for example magnetic fields, infrared light, radio waves or the like.

To allow an individual device, such as the video recorder 2d for example, to be named, it is first switched on or set to a "ready to receive" state. Using the keypad 7, the user enters an individual name, such as "Bedroom video" for example, into the input unit 3 letter by letter. The latter may have automatic text completion software, such as the T9 software that is known from mobile telephones. The entry "Bedr" for example is then automatically added to to give "Bedroom", to make inputting easier and quicker. At the end of the input, the device name entered is shown on the display 9 to allow it to be checked.

The user can then initiate the transmission of the device name that has been entered to a given device 2. The device in question is selected by way of the closeness of the input unit 3 to the given device. The wireless link between the device 2d that is selected in FIG. 1 and the input unit 3 has such a short range that only device 2d and not the adjacent devices 2c and 2e are within this range, and because of this it is device 2d that is uniquely selected. The range may be selected to be suitable in this case as a function of the nature of the devices and the network. It is preferably less than 1 m. Appreciably shorter ranges of a few centimeters may also be used, or provision may be made for the device 2 intended for selection to be touched with the input unit 3.

The transmission of the device name that has been entered may for example be effected manually, say by pressing a key 10. What is more convenient than this is for the transmission of the device name that has been entered to be initiated automatically by bringing the input unit 3 close to the device 2d to be named, i.e. to be initiated as soon as a device is within range.

The device name is transmitted to the selected device 2d and is received there by means of a receiver 4, conveyed to the name memory 6 and stored therein by suitable writing means, thus overwriting a name that was stored there previously. Completion of the storage process is acknowledged on the input unit, preferably by a signal, such for example as a visual signal on the display 6 or an audio signal. The naming of the selected device 2d has thus been completed. If the user now wishes to switch on the video recorder 2d, over the network for example by using the personal computer 2b, he can select the video recorder 2d by entering the name "Bedroom video" on the personal computer 2b or selecting this name from a list provided for the purpose.

As well as the function described above of the input unit 3, namely allowing a device name to be entered by means of the keypad 7 and dispatching or transmitting the name to the appropriate device 2, there are preferably also other functions that the input unit 3 has. One function is to read out a device name from a given device 2 and show in on the display 9, to make it possible for the user to check the device name that is stored. This interrogation of the name can be initiated in the same way as the name storage described above was initiated, i.e. preferably, but not necessarily, by bringing the input unit 3, which may thus also be referred to as an input and interrogating unit, close to the device 2 to be read from. To allow the read-out function to be provided, the means used for transmitting data between the device 2 and the input unit 3 need to be suitable for bi-directional transmission. The transmitter 5 of the input unit 3 is therefore usefully a transceiver unit. The same is true of the receiver 4 of a device 2.

Another possible function of the input unit 3 may be the input and transmission of electronic keys for encrypting the data communicated between devices or for authorizing devices to one another. In this case, the input unit 3 has a means for inputting and transmitting keys that may match corresponding means used for device names. It is then possible for a key or a dataset forming a key to be entered and transmitted and the linking of a device 2 into the network 1 to be authorized.

There are various changes and extensions that may conceivably be made to the example shown. In a further embodiment (not shown), rather than having different transmission means for communication on the network on the one hand and for communication between devices and the input unit 3 on the other, the same transmission means may for example be used. The devices may for example each have a wireless transmission unit for ZigBee or wireless LAN (IEEE 802.11). The input unit then likewise has a suitable transmission unit, but with its power controlled in the appropriate way so that its range is limited to the desired low value.

A further extension is the use for the devices of a transmission unit 4 that is purely passive in construction and is activated by radio waves. The appropriate technology is known from so-called RF tags, where electromagnetic pulses, which on the one hand supply the energy for operating the transmission unit and on the other also supply the information required, namely the new name that is to be stored in the memory 6, are received via a coil. An advantage of employing this technology is that the relevant transmission units 4 are only active when approached by a suitably designed input unit 3.

The invention claimed is:

1. A device arrangement for a network comprising:
a plurality of devices that are connected via a first electronic data link, wherein each device of the devices has a name memory for storing a device name uniquely assigned to a device of the plurality of devices, to enable the each device to be uniquely actuated within the network; and
a mobile input unit having an input device configured to allow input of a desired device name, said mobile input unit and each device of the plurality of devices being communicatively connected via a second electronic data link;
wherein the second electronic data link is configured for allowing communication between the mobile input unit and a particular one of the devices of the plurality of devices, and wherein said mobile input unit includes means to limit a communication range of the second electronic data link so that communication between the mobile input unit and the particular one of the devices via the second electronic data link exhibits a shorter range than communication between any two devices of said plurality of devices via the first electronic data link so that, by positioning the mobile input unit in a vicinity of the particular one of the devices, the particular one of the devices is selected among the plurality of devices on the network, wherein, when the particular one of the devices is selected by the mobile input unit, the mobile input unit is configured to select the device name stored in the name memory via the second electronic data link; and
wherein in response to said positioning of the mobile input unit within the vicinity of the particular one of the devices and thereby within the limited communication range of the mobile input device, the desired device name is automatically transmitted from the mobile input unit to the particular one of the devices and the name memory of the particular one of the devices is overwritten with the desired device name.

2. The device arrangement as claimed in claim 1, wherein the devices of the plurality of devices have first transmission means of a first type for linking with other devices on the network; and second transmission means of a second type for communication with the mobile input unit.

3. The device arrangement as claimed in claim 1, wherein the mobile input unit has a wireless transmission means, and the devices of the plurality of devices have a corresponding wireless transmission means for communicating with the mobile input unit and for transmitting the name.

4. The device arrangement as claimed in claim 1, wherein the range of communication between the mobile input unit and the particular one of the devices is less than 3 meters.

5. A device arrangement as claimed in claim 1, wherein the range of communication between the mobile input unit and the particular one of the devices can be set by the user.

6. The device arrangement as claimed in claim 1, wherein the mobile input unit has a display for displaying the device name read out from the particular one of the devices.

7. The device arrangement as claimed in claim 1, wherein the mobile input unit is suitable for input of a key for the particular one of the devices.

8. A mobile input unit for use in a network including a plurality of devices that are communicatively connected via a first electronic data link, the mobile input unit comprising:
an input means for input of a desired device name for a particular device of the plurality of devices;
a wireless transmission means for transmitting the desired device name to the particular device via a second electronic data link, the second electronic data link configured for communication between the mobile input unit and one such particular device at a time; and
means to limit a communication range of the second electronic data link so that communication between the mobile input unit and the particular one of the devices via the second electronic data link exhibits a shorter range than communication between any two devices of said plurality of devices via the first electronic data link so that, by positioning the mobile input unit in a vicinity of the particular device, the particular device is selected among the plurality of devices on the network;

wherein the mobile input unit is configured to change the device name stored in the name memory via the second electronic data link, and wherein in response to said positioning of the mobile input unit in the vicinity of the particular device and thereby within the limited communication range between the particular device and the mobile input unit, the mobile input unit is configured to transmit automatically the desired device name from the mobile input unit to the particular device so that a name memory of the particular device is overwritten with the desired device name.

9. A method of actuating a plurality of devices on a network, connected together in said network via a first electronic data link, each device having a name memory that stores a device name uniquely assigned to the device, to enable each device to be uniquely actuated within the network, the method comprising:

receiving a desired device name via an input means of a mobile input unit;

limiting a communication range of the second electronic data link for the mobile input unit so that communication between the mobile input unit and any one device via the second electronic data link exhibits a shorter range than communication between any two devices of said plurality of devices via the first electronic data link;

positioning the mobile input unit in a vicinity of a particular device of the plurality of devices and thereby within the limited communication range of the mobile input device;

wherein in response to the step of positioning:

selecting the particular device from among the plurality of devices on the network for communication with the mobile input unit;

when the particular device is selected, automatically transmitting the desired device name via the second electronic data link from the mobile input unit to the particular device; and automatically changing the device name stored in the particular device to the desired device name received by the particular device over the second electronic data link.

10. The method as recited in claim 9, wherein the plurality of devices on the network includes at least one of the following: a home network having a plurality of electronic devices, building control devices, home entertainment electronics devices, and network control devices.

11. The device arrangement of claim 1, wherein the plurality of devices on the network includes at least one of the following: a home network having a plurality of electronic devices, building control devices, home entertainment electronics devices, and network control devices.

* * * * *